United States Patent
Albonesi

(10) Patent No.: US 6,205,537 B1
(45) Date of Patent: Mar. 20, 2001

(54) MECHANISM FOR DYNAMICALLY ADAPTING THE COMPLEXITY OF A MICROPROCESSOR

(75) Inventor: David H. Albonesi, Rochester, NY (US)

(73) Assignee: University of Rochester, Rochester, NY (US)

(*) Notice: Subject to any disclaimer, the term of this patent is extended or adjusted under 35 U.S.C. 154(b) by 0 days.

(21) Appl. No.: 09/116,876

(22) Filed: Jul. 16, 1998

(51) Int. Cl.$^7$ .................................................. G06F 15/16
(52) U.S. Cl. ......................................... 712/43; 712/229
(58) Field of Search .................................. 711/122, 117, 711/119; 712/13, 15, 30, 43, 229; 709/221; 710/104; 713/100; 703/1

(56) References Cited

U.S. PATENT DOCUMENTS

| | | | |
|---|---|---|---|
| 4,811,214 | * 3/1989 | Nosenchuck . | |
| 5,189,314 | 2/1993 | Georgiou et al. . | |
| 5,434,992 | 7/1995 | Mattson | 711/119 |
| 5,649,174 | 7/1997 | Dockser . | |
| 5,717,893 | 2/1998 | Mattson | 711/129 |
| 5,727,208 | * 3/1998 | Brown . | |
| 5,737,750 | 7/1998 | Kumar et al. | 711/129 |
| 5,781,757 | * 7/1998 | Deshpande . | |
| 5,784,702 | 7/1998 | Greenstein et la. | 711/173 |
| 5,790,810 | 8/1998 | Kaba | 710/104 |
| 5,794,062 | * 8/1998 | Baxter | 712/3 |
| 5,802,563 | * 9/1998 | Hagersten | 711/122 |
| 5,832,205 | 11/1998 | Kelly et al. | 714/53 |
| 5,835,734 | 11/1998 | Alkalaj et al . | 710/104 |
| 5,845,317 | * 12/1998 | Pawlowski | 711/128 |
| 5,905,855 | 5/1999 | Klaiber et al. | 714/31 |
| 5,915,265 | 6/1999 | Crocker | 711/170 |
| 5,926,832 | 7/1999 | Wing et al. | 711/141 |

(List continued on next page.)

OTHER PUBLICATIONS

STRiP: A Self–Timed Risc Processor, A Dissertation Submitted to the Department of Electrical Engineering and the Committee on Graduate Studies of Stanford University in Partial Fulfillment of the Requirements for the Degree of Doctor of Philosophy, by Mark Edward Dean, Jun. 1992, pp. 1–164.

(List continued on next page.)

Primary Examiner—Eric Coleman
(74) Attorney, Agent, or Firm—Blank Rome Comisky & McCauley LLP

(57) ABSTRACT

A complexity-adaptive hardware/software system and method for a microprocessor to execute any of a plurality of diverse applications according to a predetermined instruction set architecture. The system includes dynamic hardware structures and configurable clocking system of the microprocessor for executing any particular application among the plurality of diverse applications, the dynamic hardware structures and configurable clocking system being adaptable to be organized in any of a plurality of potential configurations which are selectable according to the particular application to be executed. Configuration control is performed in response to the particular application to be executed, the instruction set architecture, and the potential configurations in which the dynamic hardware structures and configurable clocking system may be organized. The control is exercised by configuring an organization of the dynamic hardware structures and configurable clocking system to match the particular application to be executed during execution thereof. The dynamic hardware structures and configurable clocking system are reconfigured to a different organization for a match when another application is being executed, or even in the course of execution of the same application. In this way, the hardware implementation is adaptive to optimize performance of the microprocessor according to each particular application being executed among the plurality of diverse applications that may be executed.

26 Claims, 4 Drawing Sheets

U.S. PATENT DOCUMENTS

| | | | |
|---|---|---|---|
| 5,956,518 | 9/1999 | Dehon et al. | 712/15 |
| 5,958,061 | 9/1999 | Kelly et al. | 714/1 |
| 6,011,908 | 1/2000 | Wing et al. | 714/19 |
| 6,031,992 | 2/2000 | Cmelik et al. | 717/5 |
| 6,092,174 | 7/2000 | Rousskov | 712/15 |
| 6,094,695 | 8/2000 | Korher | 710/56 |
| 6,096,091 | 7/2000 | Hartman | 716/17 |

OTHER PUBLICATIONS

The National Technology Roadmap for Semiconductors—1997 Edition, pp. 1–196.

*Microdesign Resources,* Jul. 14, 1997, Microprocessor Report, p.23.

John H. Edmondson, et al., Internal Organization of Alpha 21164, a 300–MHz 64–bit Quad–issue CMOS RISC Microprocessor, Digital Technical Journal, vol. 7, No. 1, pp. 119–135.

Subbarao Palacharla, et al., *Quantifying the Complexity of Superscalar Processors,* Technical Report TR–96–1328 University of Wisconsin at Madison Nov./1996, pp. 1–47.

Kenneth C. Yeager, *The MIPS R10000 Superscalar Microprocessor,* IEEE Micro., Apr. 1996, pp. 28–40.

Gregg Lesarte, et al., *PA–8500: The Continuing Evolution of the PA–8000 Family,* 11 pages.

Subbarao Palacharla, et al., *Complexity–Effective Superscalar Processors,* Proceedings of the 24th International Symposium on Computer Architecture, Jun. 1997, pp.206–218.

Mikko H. Lipasti, et al., *Superspeculative Microarchitecture for Beyond AD 2000,* IEEE Computer, vol. 30, No. 9, Sep. 1997, pp.59–66.

Eric Rotenberg, et al., *Trace Processors,* Proceedings of the 30th International Symposium on Micro Architecture, Dec. 1997, IEEE, pp. 138–148.

Steven J.E. Wilton, et al., WRL Research Report 93/5, An Enhanced Access and Cycle Time Model for On–Chip Caches, Jul. 1994, pp. 1–58.

David W. Wall, *WRL Research Report 93/6, Limits of Instruction–Level Parallelism,* Nov. 1993, pp.1–64.

Ashok Kumar, *The HP PA–8000 RISC CPU,* Mar./Apr. 1997, IEEE Computer, vol. 17, No. 2, pp. 27–32.

Ethan Mirsky, et al., MATRIX: A Reconfigurable Computing Architecture with Configurable Instruction Distribution and Deployable Resources, FCCM'96—IEEE Symposium on FPGAs for Custon Computing Machines Apr. 17–19, 1996 Napa, CA., 10 pages.

Mikko H. Lipasti, et al., *Exceeding the Dataflow Limit via Value Prediction,* 1996 IEEE published in the Proceedings of the 29th Annual ACM/IEEE International Symposium on Microarchitecture, Dec. 2–4 1996, Paris, France, 12 pages.

Ethan Mirsky, et al., Matrix: A Reconfigurable Computing Device with Configurable Instruction Distribution (Extended Abstract), pp1–3.

H.B. Bakoglu, et al., *Optimal Interconnection Circuits for VLSI,* IEEE Transactions on Electron Devices, vol. Ed–32, No. 5, May 1985, pp. 903–909.

Arif Merchant, et al., *Analysis of a Control Mechanism for a Variable Speed Processor,* IEEE Transactions on Computers, vol. 45, No. 7, Jul. 1996, pp.793–801.

Doug Matzke, *Will Physical Scalability Sabotage Performance Gains?,* IEEE Sep. 1997, pp.37–39.

William J. Bowhill, et al., *Circuit Implementation of a 300–MHz 64–bit Second–generation CMOS Alpha CPU,* Digital Technology Journal, vol. 7 No. 1 1995, pp. 100–115.

\* cited by examiner

MECHANISM FOR DYNAMICALLY ADAPTING THE COMPLEXITY OF A MICROPROCESSOR

BACKGROUND OF THE INVENTION

The present invention relates generally to microprocessors which are fabricated on a semiconductor chip or die using very large scale integrated (VLSI) circuit technology, and more particularly to such microprocessors whose complexity is rendered adaptive.

For the sake of general background information, which is well known in the art, and to define terms used in this specification, it is deemed worthwhile to review some basic concepts of microprocessors. In its simplest form, a microprocessor consists of an arithmetic logic unit (ALU) which performs arithmetic and logic operations on data supplied to the ALU; a register unit comprising a plurality of registers in which to store data temporarily during the execution of a program (the program consisting of a series of instructions); and a control unit which supplies timing and control signals to transfer data to and from the microprocessor, to perform programmed instructions, and to perform other operations. Buses are used to transfer information internally and externally of the microprocessor, and typically include an address bus by which an encoded address of a memory location whose data contents are to be accessed is sent to an external memory; a data bus for transfer of data or instruction codes into the microprocessor and transfer of computations or operational results out of the microprocessor; and a control bus for coordinating the operations of the microprocessor and communication with external devices. Multiple ALUs as well as other components may be employed in a single microprocessor, as is the case, for example, with present-day superscalar microprocessors.

Microprocessors evolved from chip sets which were originally designed to be interfaced to work together, to single chip devices generally designed to handle a wide variety of different and diverse applications. From the concept of the earliest designs of applying an individualized approach in which virtually each transistor was laid out and optimized to its environment, the design has evolved to a hierarchical approach in which the processor is composed of a multiplicity of modules, each of which is composed of a plurality of cells. Given the microprocessor, a microcomputer is produced by connecting the microprocessor to the memory unit, as well as to input and output units by which the microprocessor responds to and affects its environment. Alternatively, memory and other components may be fabricated on the same chip as the microprocessor itself. The microprocessor and associated support circuits constitute a central processing unit (CPU) of the microcomputer which serves to address the desired memory location, fetches a program instruction stored there, and executes the instruction. Cache memory, or simply cache, is high speed local memory which is used to increase the execution speed of a program (i.e., the throughput) by storing a duplicate of the contents of a portion of the main memory. A cache controller is used to automatically or selectively update main memory with contents of the cache according to the nature of the controller. By pre-fetching one or more instructions through use of a bus interface unit (BIU), and storing them in an instruction queue while the CPU is executing instructions, throughput can be increased markedly.

System architecture is established according to register and instruction format. In the Harvard architecture and certain reduced instruction set computer (RISC) variations of that architecture, separate program and data memories may be provided, which can also improve performance of the device by allowing instructions to be fetched in advance and decoded at the same time that data is being fetched and operated on by the CPU. Use of off-chip memory improves the efficiency of a microprocessor and makes eminent sense because of the broad diversity of applications the device is designed to handle. A special form of microprocessor which generally includes on-chip memory as well as possibly other peripherals is the microcontroller, which tends to be more application-specific at least within somewhat narrow lines of applications.

Current microprocessor designs set the functionality and clock rate of the chip at design time based on the configuration that achieves the best overall performance over a range of target applications. The result may be poor performance when running applications whose requirements are not well-matched to the particular hardware organization chosen.

Computer architects generally strive to design microarchitectures whose hardware complexity achieves optimal balance between instructions per cycle (IPC) and clock rate such that performance is maximized for the range of target applications. Various features such as wide issue windows and large so-called L1 caches can produce high IPC for many applications, but if a clock speed degradation accompanies the implementation of these large structures, the result may be lower performance for those applications whose IPC does not improve appreciably. The latter applications may display improved performance with a less aggressive microarchitecture emphasizing high clock rate over high IPC. It follows that for a given set of target applications, there may be endless combinations of features leading to different clock speeds and IPC values which achieve almost identical mean performance.

For example, the Digital Equipment Corporation Alpha 21164 microprocessor (see J. Edmondson et al, "Internal organization of the Alpha 21164, a 300 MHZ 64-bit quad-issue CMOS RISC microprocessor," *Digital Technical Journal,* 7(1):119–135, Special Issue 1995), referred to herein as the 21164, and the Hewlett Packard (HP) PA-8000 CPU (see A. Kumar, "The HP PA-8000 RISC CPU," *IEEE Computer,* 17(2):27–32, March 1997), referred to herein as the PA-8000, achieve almost identical SPECfp95 performance baseline results (see *Microprocessor Report,* 11(9) :23, Jul. 14, 1997). Yet, each takes a very different approach to do so. The 21164 has a clock rate roughly three times that of the PA-8000 by use of streamlined in-order design and small (8 KB) L1 caches as well as aggressive implementation technology and circuit design. On the other hand, the PA-8000 provides a 56-entry out-of-order instruction window and multi-megabyte L1 caches which may be implemented off-chip.

While other factors certainly play a role in performance results, both of these implementations may suffer severe performance degradation on applications whose characteristics are not well-matched to the IPC/clock rate tradeoff point in the respective design of key hardware structures. For example, applications with frequently-accessed megabyte-sized data structures that do not fit in the on-chip cache hierarchy may perform less well on the 21164, since the processor is caused to frequently run at the speed of the board-level cache, than on the PA-8000 with its multi-megabyte L1 Dcache, even at its lower clock speed. Conversely, applications with small working sets and little exploitable instruction-level parallelism (ILP) may effectively waste the large cache (Dcache) and instruction window of the PA-8000, and run more efficiently on the faster 21164.

Thus, diversity of hardware requirements from application to application forces microarchitects to implement hardware solutions that perform well overall, but which may compromise individual application performance. Worse, diversity may exist within a single application, where it has been found, for example, that the amount of ILP varies during execution by up to a factor of three (see D. Wall, "Limits of instruction-level parallelism," Technical Report 93/6, Digital Western Research Laboratory, November 1993). Hence, even implementations that are well-matched to the overall requirements of a given application may still exhibit suboptimal performance at various points of execution.

Configurable architectures have been proposed (see, e.g., A. DeHon et al, "MATRIX: A reconfigurable computing device with configurable instruction distribution," *Hot Chips IX Symposium*, August 1997) to replace fixed hardware structures with reconfigurable ones so as to allow the hardware to dynamically adapt at runtime to the needs of the particular application. In general, however, these approaches are intrusive and may lead to decreased clock rate and increased latency, both of which may override the performance benefits of dynamic configuration. Accordingly, configurable architectures are currently relegated to specialized applications and have yet to be proven effective for general-purpose use.

It would be desirable to provide the flexibility of a non-intrusive or low-intrusive, evolutionary approach to implementing configurability within conventional microprocessors. It is a principal objective of the present invention to do so, and this is achieved, according to the invention, by means of a device and method referred to from time to time herein as a Complexity-Adaptive Processor™, or CAP™, microprocessor device.

SUMMARY OF THE INVENTION

The present invention is directed to a technique or approach by which the complexity of the microprocessor may be rendered adaptive, i.e., to allow the complexity of the device to be altered dynamically to enhance its performance for a particular application. In general, in the Complexity-Adaptive Processor device of the invention, the typical tradeoff between instructions per cycle (IPC) and clock rate is altered at runtime to dynamically match the changing requirements of the instruction stream. By way of example only, and not of limitation, the CAP device and method can achieve this flexibility with potentially no cycle time impact compared to a fixed architecture, by exploiting repeater methodologies, such as wire buffers, which are used increasingly in deep sub-micron (line width) designs. Application of the approach of the invention to on-chip memory caches and instruction queues has indicated that CAP devices have the potential to significantly outperform conventional approaches in both general-purpose and scientific applications.

In the best mode currently contemplated for practicing the invention, a complexity-adaptive hardware/software system is provided for a microprocessor to execute any of a plurality of diverse applications according to a predetermined instruction set architecture. The system includes dynamic hardware structures for executing any particular application among the plurality of diverse applications, these hardware structures being adaptive for organization in any of a plurality of potential configurations which are selectable according to the particular application to be executed. Configuration means responsive to the particular application to be executed, the instruction set architecture, and the potential configurations in which the dynamic hardware structures may be organized, are provided for configuring an organization of the dynamic hardware structures to match the particular application to be executed during execution thereof. The configuration means reconfigures the dynamic hardware structures to a different organization for a match at a subsequent time during execution of that application, or when another of the diverse applications is being executed, so as to adapt the hardware implementation to optimize performance of the microprocessor according to each particular application being executed.

The hardware portion of the system includes a dynamic clock for synchronous operation of each configuration into which the dynamic hardware structures are organized, and the configuration means includes control means for modifying clock speed during execution of each particular application according to performance characteristics of clock speed and instructions per cycle of each configuration. This provides a dynamic match of a respective configuration to changing requirements of an instruction stream derived from the predetermined instruction set architecture, for optimization of microprocessor performance.

Configuration control is exercised by the configuration means through various software and hardware, including dynamic reconfiguration control logic, for acquiring sufficient information concerning each particular application as well as performance characteristics of instructions per cycle and clock speed of each configuration into which the dynamic hardware structures are organizable, from which to predict a configuration for optimum performance over each interval of execution of an application. This allows a configuration schedule to be created for adapting the organization of the dynamic hardware structures to changing requirements during execution of each application.

The configuration control also includes performance counters for tracking the performance of each of the dynamic hardware structures and for supplying digital indicators of such performance to the dynamic reconfiguration control logic. Additionally, configuration registers are used for setting the configuration of the dynamic hardware structures according to digital data loaded into the configuration registers. The configuration registers are loaded with digital data, at least in part by the dynamic reconfiguration control logic from digital performance indicators supplied by the performance counters. A compiler generates executable commands and configuration instructions in response to an application to be executed and the instruction set architecture, and a runtime system operates on the commands and instructions, and on the digital performance indicators from the performance counters to supply data representative thereof to the dynamic reconfiguration control logic and to assist in loading the configuration registers, whereby to aid in creating the configuration schedule used in executing an application.

The closest known approach to that of the CAP device and method is the complexity-effective processor (see S. Palacharla et al, "Complexity-effective superscalar processors," *Proceedings of the 24th International Symposium on Computer Architecture*, pages 206–218, June 1997) which, like the CAP approach, seeks to obtain the highest performance through close attention to balancing IPC and clock speed in the design of critical processor hardware. (A superscalar processor is capable of fetching, decoding and executing more than one instruction at a time). But in the complexity-effective processor approach, the tradeoff between the two parameters of IPC and clock speed is fixed at design time, just as with all conventional designs. In contradistinction, the CAP approach of the present invention uses configurable hardware for the core superscalar control and cache hierarchy structures of the processor in a way that minimizes, and often even eliminates altogether, any cycle time or latency penalty relative to a conventional superscalar design, and also uses a dynamic clock that adapts along with the hardware structure to allow each configuration to run at its full clock rate potential. As a result, the CAP device and method can provide many different IPC/clock rate tradeoff points within a single hardware implementation, without sacrificing the high clock rate of a fixed architecture. If the configurable hardware is effectively managed by selecting the best configuration at critical runtime points, a single CAP design can outperform conventional designs on a wide range of both scientific and general-purpose applications.

In the preferred embodiment, the microprocessor device may be fabricated on a single semiconductor integrated circuit chip, although multi-chip (chip set) designs, and microcontroller designs in which some of the typically off-chip units, particularly memory units, are located on-chip, are within the confines of the present invention. In fact, the invention is applicable in general to the entire field of complex digital designs. And although the preferred embodiment employs clocked synchronous logic, the invention may be used in asynchronous designs as well.

BRIEF DESCRIPTION OF THE DRAWINGS

The above and still further aims, objectives, features, aspect and attendant advantages of the invention will become apparent from a consideration of the following detailed description of the presently contemplated best mode of carrying out the invention, as set forth in a preferred embodiment and method, taken in conjunction with the accompanying drawings in which.

DETAILED DESCRIPTION OF THE PREFERRED EMBODIMENT AND METHOD

Figure 6:
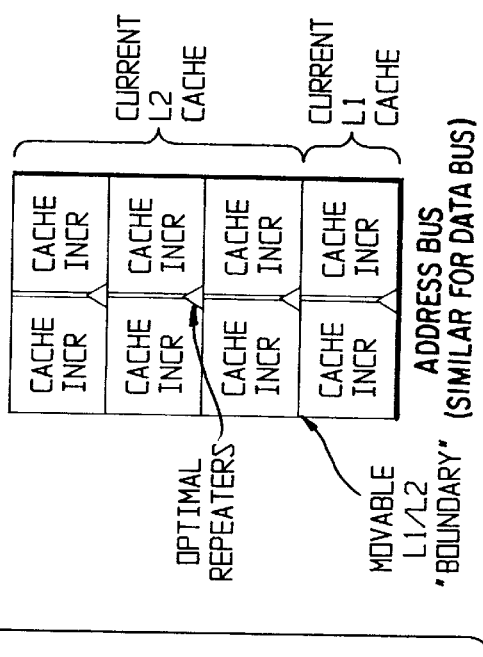
FIG. 6 is a simplified block diagram of the structure of a preferred embodiment of the invention for a complexity-adaptive cache hierarchy.

Before describing the details of the invention, it will be helpful as an introduction to discuss the scaling of logic and wire delays with feature size and their implications on the design of future semiconductor processor hardware structures. Semiconductor feature sizes have decreased at a rapid pace, and this trend shows no sign of slowing. Devices with line widths of 0.18 micrometers (microns, or $\mu$m) are expected sometime in 1999, and 0.13 $\mu$m devices appear likely by 2003 (see, e.g., "The national technology roadmap for semiconductors," *Semiconductor Industry Association,* 1997). This allows a greater number of transistors to be designed into a given piece of silicon area because, to a first order, transistor delays scale linearly with feature size, while wire delays remain constant; but wire delays are increasingly dominating overall delay paths as feature sizes are decreased. It is therefore becoming almost customary to apply repeater methodologies in deep submicron designs, in which buffers are placed at regular intervals within a long wire to reduce wire delays. Indeed, wire buffers are used not only in buses between major functional blocks, but within self-contained hardware structures as well. And as feature sizes continue to decrease to 0.18 microns and below, other smaller structures will require the use of wire buffers in order to meet timing requirements.

Of greatest interest from the standpoint of the present invention is the extent to which wire buffers will be required in the critical hardware structures of future dynamic superscalar processors. These include the instruction cache hierarchy, branch predictor, register rename logic, instruction queues and issue logic, register files, data cache hierarchy, Translation Lookaside Buffers (TLBs), and reorder buffers, as well as the structures required for proposed new mechanisms such as value prediction (see M. Lipasti et al, "Exceeding the data-flow limit via value prediction," *Proceedings of the 29th International Symposium on Microarchitecture,* pages 226–237, December 1996). These structures are primarily composed of RAM or CAM-based arrays implemented as replicated storage elements driven by global address and data buses. For purposes of this discussion, control signals, if required, are included with the address bus. If these structures are implemented with many elements or ports, their overall delay may reach the point at which they impact processor cycle time.

To obtain a first-order understanding of general wire delay trends of these structures, it is instructive to analyze both unbuffered and buffered wire delays of various sizes of caches and instruction queues using different feature sizes. These results are obtained using Bakoglu's optimal buffering methodology (H. Bakoglu et al, "Optimal interconnect circuits for VLSI," *IEEE Transactions on Computers,* 32(5): 903–909, May 1985), technology and layout parameters from the CACTI cache cycle time model (S. Wilton et al., "An enhanced access and cycle time model for on-chip caches," Technical Report 93/5, Digital Western Research Laboratory, July 1994) with parameters scaled appropriately for the feature size, and by assuming that buffer delays scale linearly with feature size while wire delays remain constant.

Figure 1:
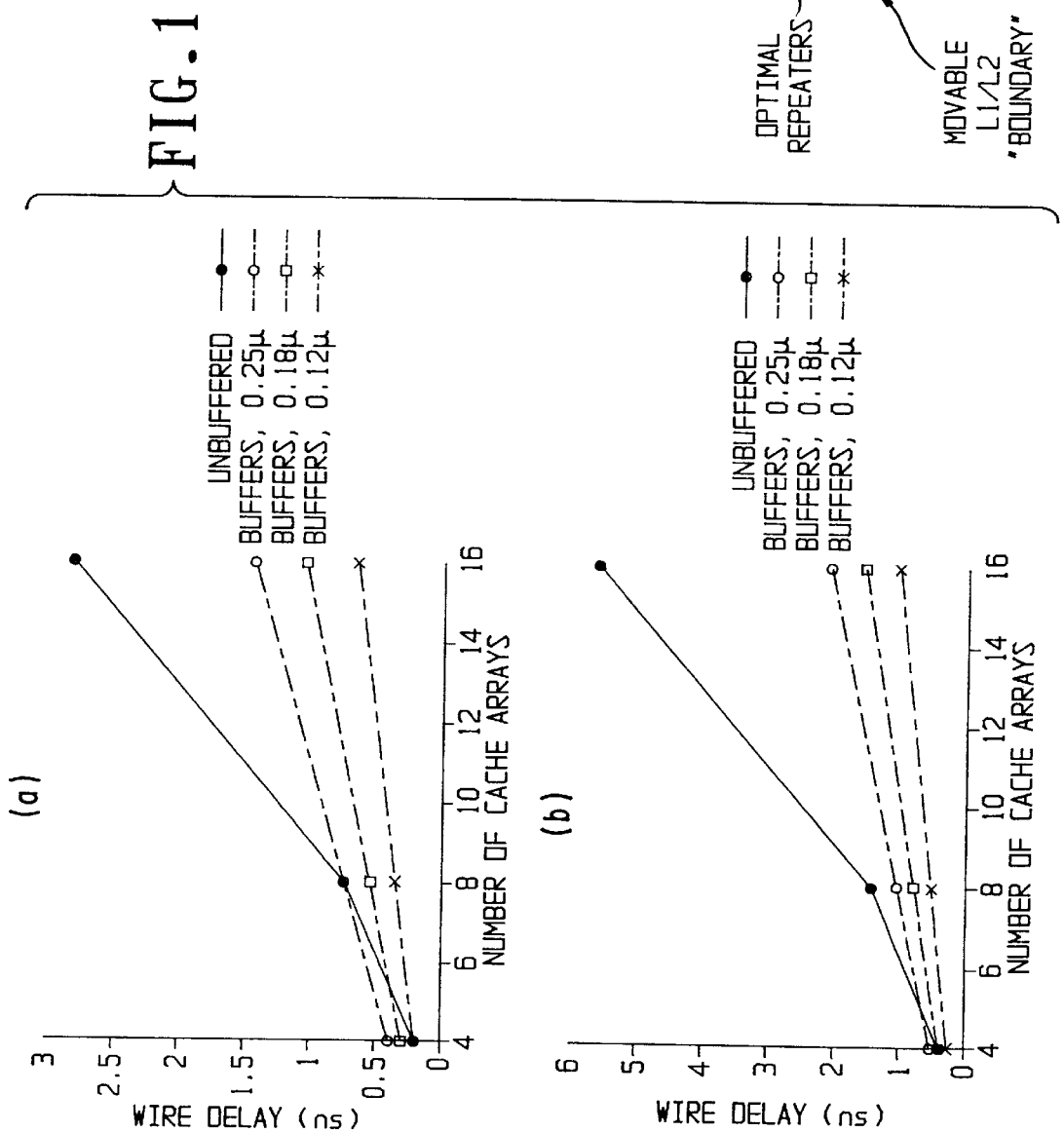
FIGS. 1(a) and 1(b) are charts that show unbuffered and buffered cache address wire delays (data delays are identical) as a function of the number of subarrays and feature size for caches constructed from 2 KB (FIG. 1(a)) and 4 KB (FIG. 1(b)) cache subarrays.

FIGS. 1(a) and 1(b) shows unbuffered and buffered cache address wire delays (data delays are identical) as a function of the number of subarrays and feature size for caches constructed from 2 KB (in 1(a)) and 4 KB (in 1(b)) cache subarrays. Only one unbuffered curve is shown in each of these Figures, as wire delays remain constant with feature size. The results indicate that 16 KB and larger caches constructed from 2 KB subarrays and implemented in 0.18 $\mu$m process technology will benefit from buffering strategies. The same is true for 32 KB and larger caches constructed from 4 KB subarrays and implemented in 0.18 $\mu$m technology.

The instruction queue follows the integer queue design of the Mips R10000 processor, with each entry containing 52 bits of single-ported RAM, 12 bits of triple-ported CAM, and 6 bits of quadruple-ported CAM (see K. Yeager, "The Mips R10000 superscalar microprocessor," *IEEE Micro.*, 16(2):28–41, April 1996). Under the assumptions that the area of a CAM cell is twice that of a RAM cell, and that the area grows quadratically with the number of ports (since both the number of wordlines and bitlines scale linearly with the number of ports), each R10000 integer queue entry is equivalent in area to roughly 60 bytes of single-ported RAM.

Figure 2:
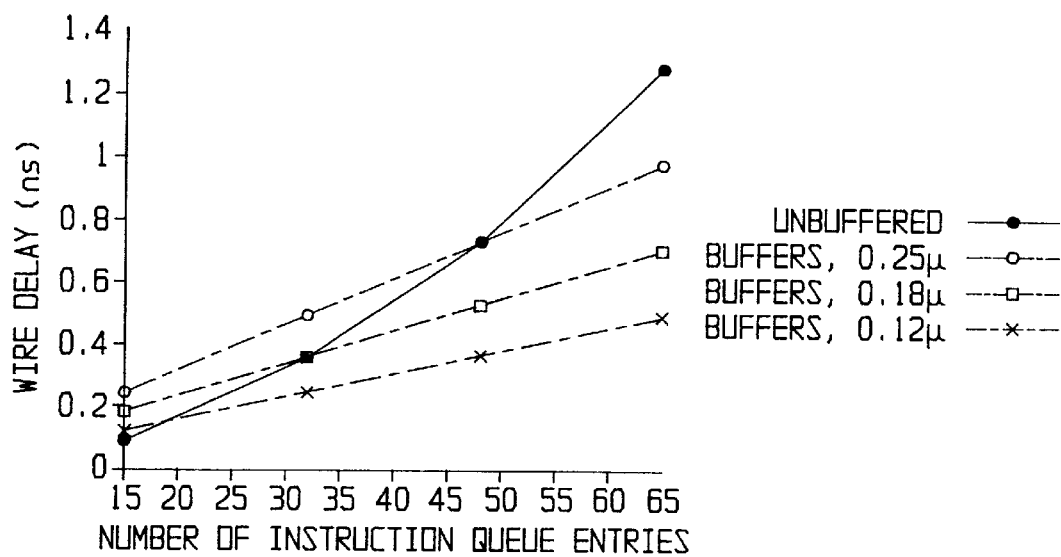
FIG. 2 is a chart showing unbuffered and buffered integer queue wire delays as a function of the number of queue entries and feature size.

FIG. 2 shows unbuffered and buffered integer queue wire delays as a function of the number of queue entries and feature size. Buffering performs better for a 32-entry queue with 0.12 micron technology, while larger queue sizes favor the buffered approach with a feature size of 0.18 microns. If eight or more instructions are sought to be issued in a cycle, integer queues larger than 32 entries will be necessary. In addition, increased issue width will necessitate an increase in the size of each queue entry, because of more ports and a widening of the fields for rename registers and levels of branch speculation. Consequently, the use of buffers is a virtual necessity to minimize integer queue wire delays in future technologies. Other regular RAM or CAM-based structures such as branch predictor tables and TLBs may well exceed these integer queue sizes, making them prime candidates for wire buffering strategies also. Widespread adoption of buffered wire methodologies throughout conventional microprocessors will create new opportunities for architectural innovation.

Figures 3A, 3B:
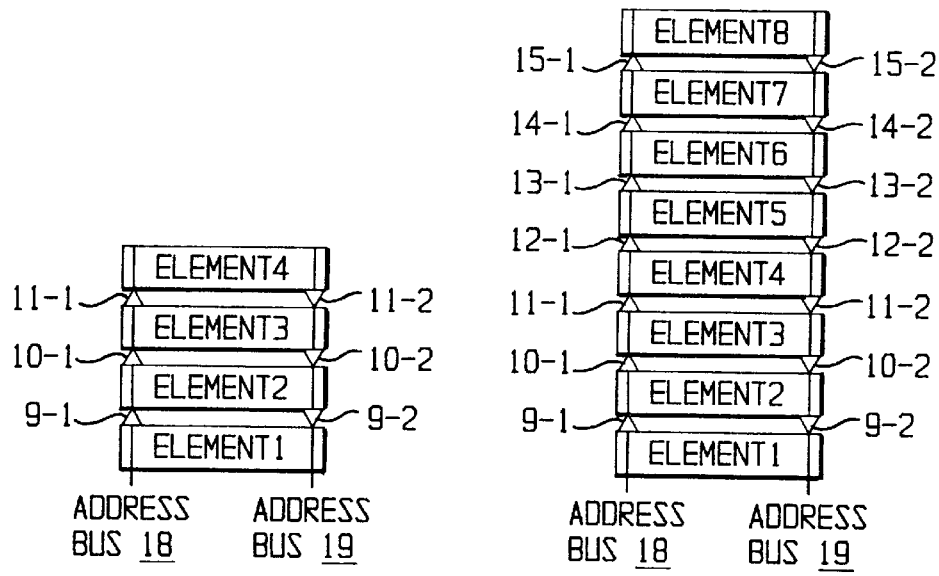
FIGS. 3(a) and 3(b) are block diagrams of conventional processor hardware structures containing identical but different numbers of elements electrically isolated by buffers in wire segments therebetween in global address and data busses.

FIG. 3(a) is a block diagram showing a conventional hardware structure containing four identical elements 1, 2, 3, 4, and three sets of buffers 9-1/9-2, 10-1/10-2, and 11-1/11-2 to reduce wire delay in both the global address bus 18 and the data bus 19. FIG. 3(b) is a similar block diagram, except that the size of the structure is double that of FIG. 3(a), with elements 1–8, and seven sets of buffers 9-1/9-2 through and including 15-1/15-2. The number of buffers or buffer sets is exemplary only, and not intended to be limiting; the optimal number may be less or more than the number of elements. In any event, unlike unbuffered busses in which the entire line capacitance is seen at every element, each wire segment in both parts of FIG. 3 has virtually equal delay and is electrically isolated from adjacent segments by the buffers. The isolation creates a distinct hierarchy of delays, in which individual element delays are independent of the number of remaining elements in the structure. As a result, the delays of elements 1–4 in the circuit of both parts of FIG. 3 are the same, despite the doubling of the size of the structure in FIG. 3(b) relative to that in FIG. 3(a). Although this property is a substantial factor in the capability of the present invention to incorporate adaptivity in a low-intrusive manner, it is not a requirement for doing so.

The larger structure in the eight-element design on the critical processor timing path of FIG. 3(b) may result in a higher IPC than that of the faster clock speed structure of the four-element design of FIG. 3(a), in applications which make frequent use of the additional elements. The options of increased IPC and reduced clock speed versus reduced IPC and faster clock speed may be made available in a single implementation of the hardware structure if it is of the eight-element design of FIG. 3(b), but in which the capability exists to conditionally disable elements 5–8, and further, if a dynamic clock is employed which sets the on-chip processor clock speed according to whether four or eight elements are enabled.

Figure 4:
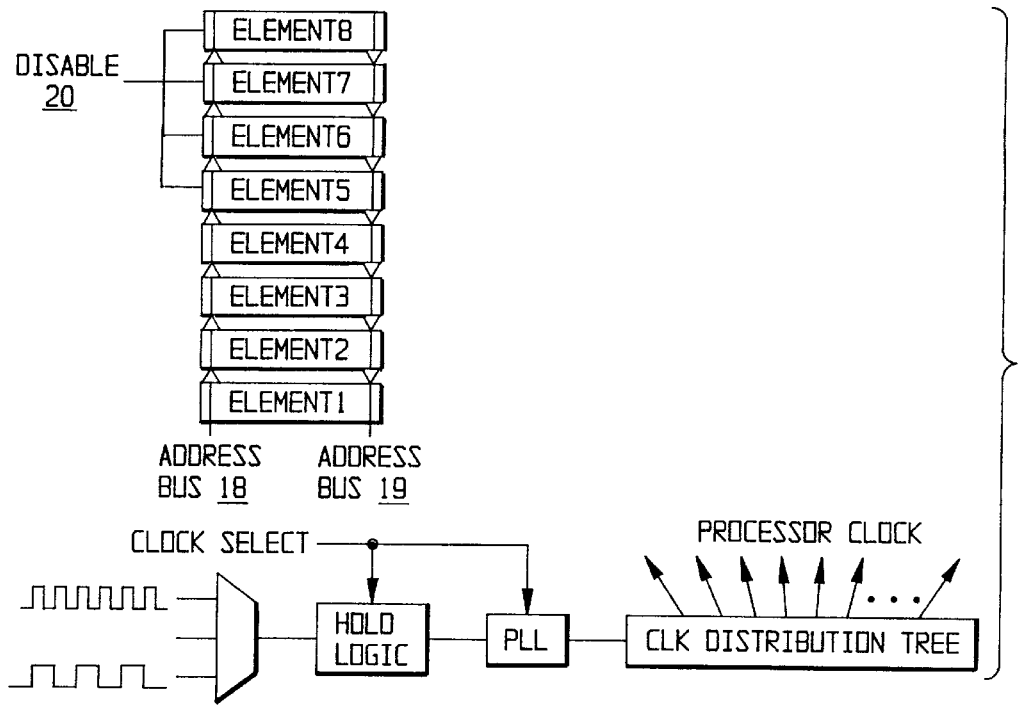
FIG. 4 is a simplified block diagram of an embodiment of a complexity-adaptive processor hardware structure according to the invention.

Such a single implementation of a complexity-adaptive processor hardware structure is shown in the block diagram of FIG. 4. This hardware structure may be configured conditionally with either four or eight elements by control means (e.g., a disable signal) at 20 for selectively disabling elements 5–8 (or, what is the same thing, selectively enabling elements 1–4), and thus has the capability to be dynamically reconfigured to meet the changing requirements of the instruction stream. Moreover, this desirable objective is achieved without substantial (or potentially even any) cycle time degradation compared to the fixed conventional hardware structure designs of FIGS. 3(a) and 3(b). This concept may be generalized to create structures with finer configuration increment, which terminology refers to the granularity at which the structure increases or decreases in size and/or other organizational parameter. For example, the hardware structure of FIG. 4 can support a configuration increment of a single element if individual disable signals are provided for each element, rather than the single disable signal 20 affecting multiple elements 5–8 as shown.

In general, the minimum configuration increment that can be supported without imposing a delay penalty is that which results from using the optimal number of buffers needed to minimize wire delay. In this example, if the conditional disabling logic does not unduly impact timing delays, then the complexity-adaptive hardware structure will suffer no cycle time penalty relative to a conventional design. It is worth noting that some form of conditional disabling logic for adjusting the size of the hardware structure might be found in a conventional design, but, in contrast to the objectives and features of the present invention, its purpose would be substantially limited to the control (i.e., reduction) of power dissipation. It will be appreciated by those skilled in the art, then, that once a repeater methodology has been adopted for a particular hardware structure for delay reasons, a fixed structure can be converted into a complexity-adaptive structure with little additional effort, time or cost.

Pure logic structures designed by replicating common elements, such as a tree of priority encoders used in selecting instructions to issue (see, e.g., S. Palacharla et al, "Quantifying the complexity of superscalar processors," Technical report TR-96-1328, University of Wisconsin—Madison, November 1996), can also be made complexity-adaptive by selectively disabling particular elements. The flexibility of the CAP approach allows the designer to increase (or decrease) the size of certain structures to meet the requirements of particular applications which, although different from and encountered somewhat infrequently relatively to the more typical applications, are strategically important, while allowing structures to be "shrunk" to better match the IPC/clock rate tradeoff point of the more typical applications.

To achieve high performance, it is essential that some structures be accessed in a single cycle—for example, an instruction queue where a multi-cycle issue operation would severely increase data dependency-related stalls. When increasing the size of such structures to the point where they fall on the critical timing path, assuming that the increase in structure size results in a net performance gain, it is appropriate to decrease the clock rate. However, for structures where single-cycle access is not as critical, such as the Dcache, an alternative is to vary the latency (in cycles) instead of the clock rate—for example, by increasing the latency rather than slowing the clock. The advantage of this alternative is that only instructions which make use of the hardware structure are affected, as the clock speed is unchanged. In the case of the Dcache, arithmetic units are unaffected by the increase in Dcache size, and thus, arithmetic instructions still complete at the same rate. Another alternative for some structures would be to change both the latency and the clock. In any event, the design and location of selectable latches should be done with care to avoid undue impact on critical path delays and hardware structure size, and pipeline control and scheduling complexities introduced by this scheme should be examined carefully for resolution.

Figure 5:
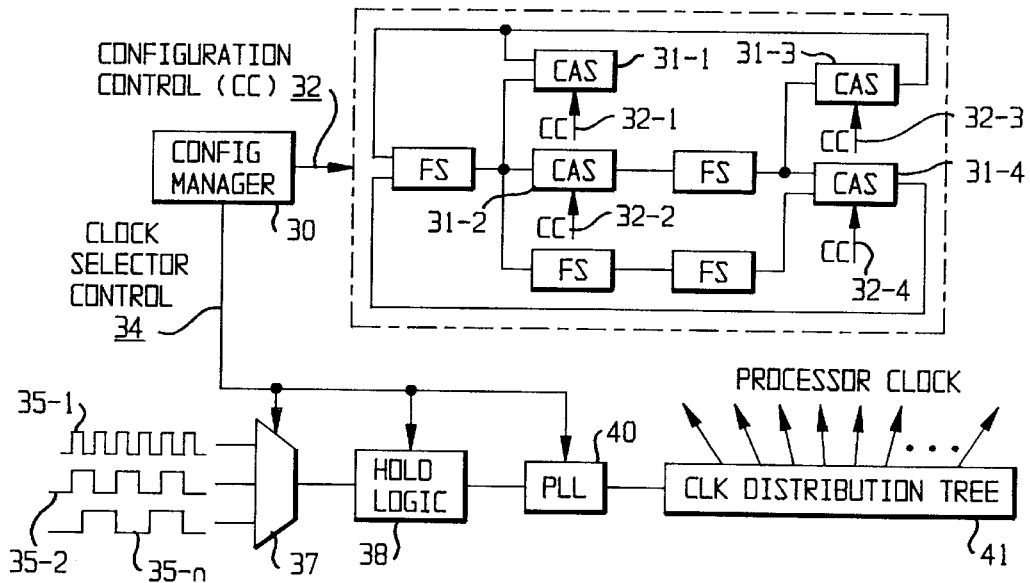
FIG. 5 is a simplified block diagram of an embodiment of the overall organization of a complexity-adaptive processor (CAP) device according to the invention.

FIG. 5 is a simplified block diagram of the overall organization of a CAP device of the present invention, showing both fixed structures (FS) and complexity-adaptive structures (CAS) and in which configuration control (CC) signals control the organization of each CAS. The processor, caches, and external interface are conventional FS structures intermixed with CAS structures such as those which have been described thus far herein. Fixed hardware structures are employed where implementing adaptivity is either unwieldy, or likely to strongly impact cycle time, or likely to be ineffective because of lack of diversity in target application requirements for a particular structure.

In the CAP device of FIG. 5, configuration manager 30 controls the organization of each CAS 31-1, -2, -3, -4 (by means of the CC signals 32) and the clock speed of the entire processor (by means of the clock selector control signal 34) at appropriate execution points. The various clock speeds are predetermined based on worst-case timing analysis of each FS and combination of CAS configurations. A plurality of clock sources 35-1, -2, . . . , -n, are selectable through a conventional clock holding and multiplexing scheme (analogous to some scan designs) employing a multiplexer (or gate) 37, hold logic 38, and phase-locked loop 40, all of which are controlled by the clock selector control signal 34. Other clocking schemes may alternatively be employed (see, e.g., M. Dean, "STRIP: A self-timed RISC processor," Technical Report CSL-TR-92-543, Stanford University, July 1992; U.S. Pat. No. 5,189,314 of C. Georgiou et al on Variable Chip-Clocking Mechanism, issued February 1993; and A. Merchant et al, "Analysis of a control mechanism for a variable speed processor," *IEEE Transactions on Computers*, 45(7):793–801, July 1996). The selected clock is distributed to various appropriate points in the processor via a clock distribution tree 41.

Although dynamic clocking schemes have been proposed previously, as indicated by the exemplary references noted immediately above, this is a departure from the conventional microprocessors which are developed using synchronous design techniques that assume a stable clock signal. Such conventional design techniques can also be used in the CAP device, in that a single clock distribution tree 41 is used in the same manner as with a conventional design. Inevitably, a viable dynamic clock requires a capability that one clock be stopped and another started without loss of data. In any event, the complexity-adaptive design introduces a potential inefficiency for configurations in which pipeline stages must be designed according to the fastest clock used, relative to fixed designs with the same hardware features. Despite the resulting inefficiency for operation at the slower clock speeds (which may be circumvented to an extent by increasing the minimum size of each CAS structure and using coarser grained increments), the overall performance advantages of CAP devices far override such inefficiency that may exist by virtue of its flexible architecture.

Effective configuration management requires on-chip performance monitoring hardware, configuration registers, and good heuristics (which may be implemented in software, hardware, or both) for selecting optimal CAS configurations and reconfiguration points during execution. A CAP compiler (not shown) may be used to perform profiling analysis to determine at which points within the application particular CAS configurations should be enabled. Alternatively, adaptive control hardware (not shown) may be used to read the performance monitoring hardware (not shown) at regular intervals at runtime, analyze the performance information, predict the configuration which will perform best over the next interval (e.g., using modified branch-prediction techniques), and switch configurations as appropriate.

For the configuration manager 30, some "cleanup" operations may be required in transitioning from one configuration to another, such as for the case of entries in the portion of a configurable queue to be disabled and which therefore need to be emptied before reconfiguration takes place. In general, however, these operations are relatively simple and involve sufficiently low overhead that they will not unduly impact the CAP device performance. Also, in determining the optimal reconfiguration frequency, a tradeoff must be made between maintaining processor efficiency and minimizing reconfiguration overhead.

Disabling portions of the complexity-adaptive structures affects the use of chip resources, in that it may be viewed as representing wasted transistors. However, this would not aptly reflect the importance of the transistors that may be disabled in one application or in portions of the operation for performance of a particular application, but which are enabled and vastly enhance performance in other applications. Moreover, some portions of many different semiconductor devices, including conventional microprocessors, are often set aside for purposes of desired redundancy, with the same or even greater effect on chip resources or "real estate."

Communication between CAP devices operating at different frequencies may require implementing synchronizers between the processor clock and a fixed-frequency external bus clock, an approach which is commonly used in multi-processors that permit the coexistence of different microprocessors running at different clock speeds. Direct interfaces to external memory chips may be handled within the processor clock domain by making control signals programmable, which is a common practice presently used to allow processors to take advantage of faster components as they become available.

Despite these issues, the CAP approach of the present invention provides considerable advantages over schemes employed in the prior art, including the fixed structure designs and the complexity-effective processor designs (see S. Palacharla et al, "Complexity-effective superscalar processors," ibid.). Perhaps paramount among its advantages, the invention enables architects and designers to push hardware structures beyond cycle time limits to meet the needs of particular applications, without penalizing other applications that perform more efficiently with a smaller structure running at a faster clock rate. As observed by S. Palacharla et al in an article on "Quantifying the complexity of superscalar processors," ibid., as issue widths increase, the complexity of larger superscalar control structures and on-chip caches is of greater concern with respect to potential impact on cycle time. For some applications, however, increased cycle time is justified if accompanied by a larger increase in IPC. And the CAP design can be tailored at runtime to the optimal IPC/clock rate tradeoff point of the dynamic instruction stream, thereby achieving balanced performance across a wide range of applications.

Another advantage of the CAP approach is that it can be used with other advanced architectural approaches such as those which are highly dependent on the effectiveness of critical control and storage structures (see, e.g., M. Lipasti et al, "Superspeculative microarchitectures for beyond AD 2000," *IEEE Computer*, 30(9):59–66, September 1997; and E. Rotenberg et al, "Trace processors," *Proceedings of the 30th International Symposium on Microarchitecture*, pages 138–148, December 1997), which are typically largely RAM or CAM-based and therefore can be made complexity-adaptive.

Beyond its considerable performance benefits, the CAP device and method offers potential for improved power management, through appropriate management at runtime of the several performance/power dissipation design points provided by the controllable clock frequency and hardware disables of the design. The lowest-power mode is enabled by setting all complexity-adaptive structures to their minimum size, and selecting the slowest clock. This mode may be selected for the processor, for example, when a power failure occurs and an uninterruptible power supply is enabled. In addition, the CAP design may be configured for product environments ranging from high-end servers to low power laptops.

Complexity-adaptive structures are also advantageous in their ease of implementation in asynchronous processor designs, which employ a handshaking protocol instead of a global clock, with each stage potentially communicating at a different speed. In synchronous handshaking, wait states are added to complete the memory access time; and when a memory is accessed a return from memory to microprocessor is asserted if the read or write cycle is not yet completed. It is not until the return line is not asserted that the CPU stops cycling in a wait state and continues execution of the instruction. With an asynchronous design, there is no clock. Rather, each stage uses a handshake to transfer information. Hence, different stages of the latter design may communicate at different speeds. The complexity-adaptive approach allows very large structures to be designed, with average stage delay much lower than the worst-case delay if faster elements are frequently accessed. Here, stage delays are automatically adjusted according to the location of elements, thereby obviating the need for a configuration manager.

Yet another advantage of the CAP architecture is fast reconfiguration time relative to many other configurable architectures, by virtue of the CAP implementation in custom silicon technology and its simple register and disable-based configuration scheme. Although the need to reliably switch clock sources may require tens of cycles to pause the active clock and enable the new clock, the CAP device still operates much faster than many configurable architectures, considering the clock speed differential.

One mode of carrying out the invention is implemented in an embodiment that uses a simple process-level adaptive scheme in which the CAS configuration remains unchanged throughout the execution of a given application, but can vary from application to application. For the sake of clarity, two separate implementations of this particular embodiment are described herein, one of which is a complexity-adaptive cache hierarchy, and the other a complexity-adaptive instruction issuing logic.

FIG. 6 is a simplified block diagram of the structure of a complexity-adaptive cache hierarchy. Only the implementation for the address bus 18 is shown in the Figure, but the same or a similar structure would be used for the data bus. Cache increments are assigned to L1 and L2 caches as needed for the particular application to be executed. The general structure directly follows from large conventional cache designs that use multiple common cache banks (see, e.g., W. Bowhill et al, "Circuit implementation of a 300-MHZ 64-bit second-generation CMOS Alpha CPU," *Digital Technical Journal*, 7(1):100–118, Special Issue 1995; and G. Lesartre et al, "PA-8500: The continuing evolution of the PA-8000 family," *Proceedings of Compeon '97*, 1997). Cache increments that are not part of the L1 cache are not disabled but are merely defined as belonging to the L2 cache. The "boundary" L1/L2 between the L1 and L2 caches is movable and defines the timing of the two caches. To simplify instruction scheduling and forwarding of load results, the L1 cache latency is kept constant in terms of cycles. The cycle time varies, however, depending on the delay of the slowest L1 cache increment. L2 cache banks have longer address and data bus delays than the L1 banks and therefore require more access cycles. Optimal repeaters are located between each set of cache increments along the respective bus.

The cache hierarchy is such that the two caches together have a maximum size but the size of each is variable by moving the boundary, and the hierarchy is configured and reconfigured to increase or decrease the size of each cache at the expense of the other. To reconfigure without having to invalidate or transfer data, an exclusive caching policy is employed within the hierarchy, together with enforcement of a simple rule, viz.: As an increment is added to (or subtracted from) the L1 cache, its (i.e., the cache's) size and associativity are increased (or decreased) by the increment size and associativity, and the L2 cache size and associativity are changed accordingly. This rule maintains a constant mapping of the index and tag bits independent of placement of the L1/L2 boundary. Two-level exclusive caching avoid a situation where two copies of the same cache block that were previously located separately in L1 and L2, are upon reconfiguration located in the same cache because of a redefinition of the L1/L2 boundary. With exclusion, a cache block is either in L1 or L2 but not both. A drawback of this mapping rule is that it can lead to highly associative configurations, and even though some applications may not benefit from such wide associativity, this is a reasonable tradeoff to simplify the mapping problem.

By way of example, and not of limitation, in an exemplary embodiment for this implementation the total size of the two-level organization is a 128 KB structure composed of sixteen 8 KB two-way set associative and two-way banked increments, with L1 sizes ranging from 8 KB to 64 KB (and respective L2 sizes occupying the remainder of the 128 KB structure).

Unlike a conventional cache in which tag arrays are physically separated from data arrays, each cache increment of the complexity-adaptive cache hierarchy of FIG. 6 is preferably a complete subcache containing both tag bits and status bits. Given the exclusion determined by the aforementioned exclusive caching policy within the hierarchy, and the mapping of the cache, only one of the L1 or L2 cache increments will be accessed (receive a "hit") on any given instruction. The time per instruction (TPI), computed as the cycle time divided by IPC, is a measure of overall performance of the complexity-adaptive cache hierarchy and is usable as a basis for reconfiguration decisions regarding the location of the movable boundary between caches of the hierarchy. Grouping the tags and data arrays simplifies the design and allows each cache to enable its local drivers (not shown) on a hit. With this manner of organizing the cache, each cache can act locally without need for global information, and additionally benefits from shorter wire lengths between the tag comparators and data output drivers. Localized wiring is desirable if not essential with smaller feature sizes, to maintain high clock rates (see, e.g., D. Matzke, "Will physical scalability sabotage performance gains?," *IEEE Computer,* 30(9):37–39, September 1997). Computer analysis has demonstrated that for a configuration/reconfiguration approach in which the same configuration is maintained throughout the execution of a given application (but is changeable from application-to-application) average TPI reductions of 7–9% are attainable on an application base that is only modestly diverse from conventional design, and considerably greater reductions can be attained for individual applications that are highly diverse to the conventional.

An implementation of the exemplary embodiment for a complexity-adaptive structure for instruction issuing logic (or instruction queues) comprises a structure hose size can take on any of the values (again, without limitation) ranging from 16 to 128 entries at 16-entry increments.

Figure 7:
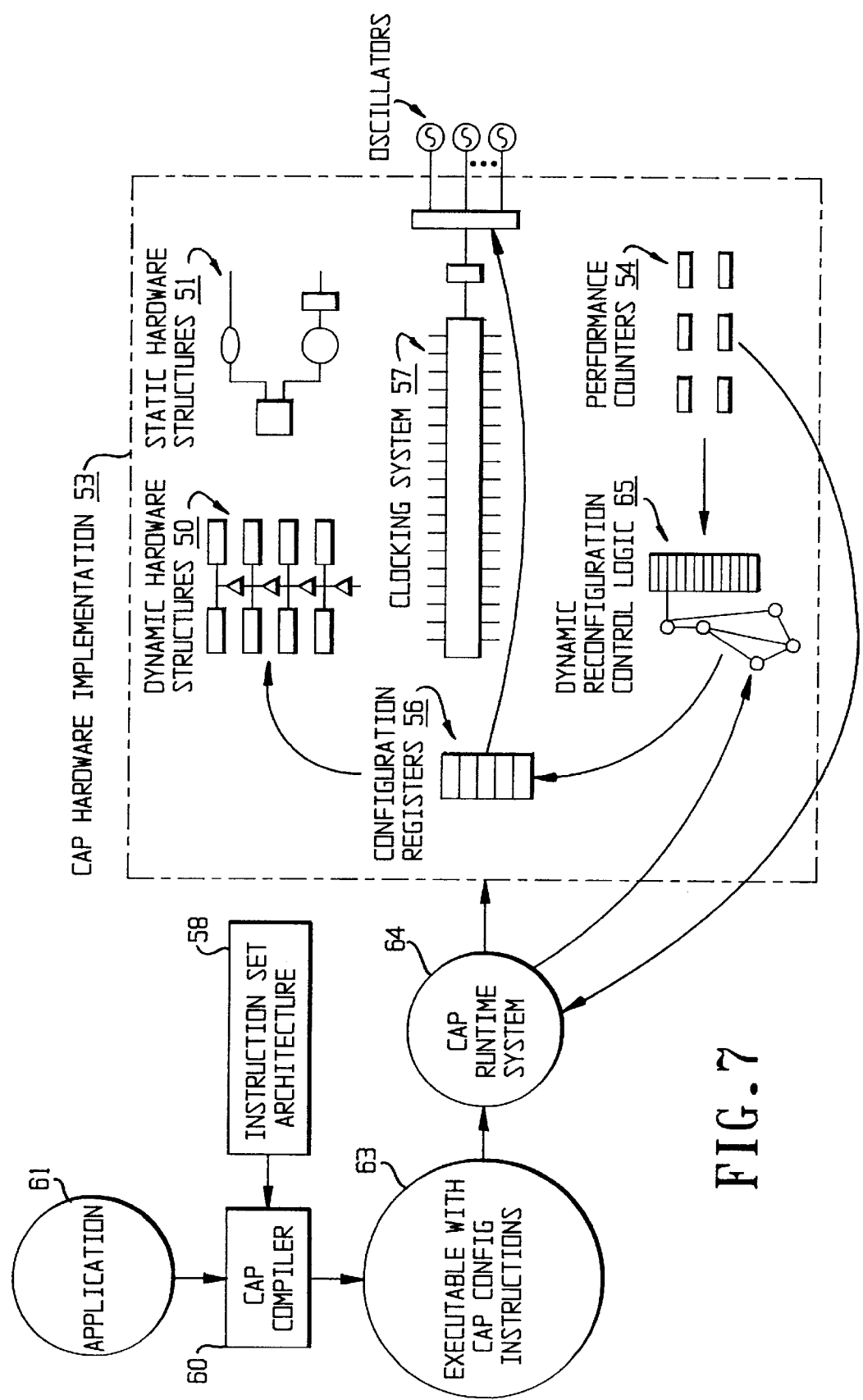
FIG. 7 is an overall CAP hardware/software system according to the invention.

An overall CAP hardware/software system illustrating the elements thereof, and incorporating the best mode presently contemplated for practicing the invention, is shown in FIG. 7. Among the components of the system of FIG. 7 are dynamic hardware structures 50 as have been described above (e.g., the CAS structures of FIG. 5), with adaptable complexity and timing (latency and/or cycle time). In superscalar processors, both present and projected, these structures may include instruction cache hierarchy, branch predictor tables, register rename logic, instruction queues, issue logic, register files, data cache hierarchy, translation lookaside buffers (TLBs), reorder buffers, and value prediction, for example, primarily composed of RAM- or CAM-based arrays implemented as replicated storage elements driven by global address and data buses, as well as by control signals. These implementations include wire buffers or other repeater methodologies that impose delays which, with the replication, can sum to levels that impact processor cycle time, and which are resolved by the complexity-adaptive methodologies described herein. Conventional static hardware structures 51 (e.g., designated by FS in FIG. 5) are also made available as part of the CAP hardware implementation 53, for use in situations when it is either unwieldy to implement adaptivity, or to do so would strongly impact cycle time or would be ineffective because of a lack of diversity in target application requirements for the particular structure.

Performance counters 54 of the hardware implementation track the performance of each dynamic hardware structure. The performance counters are readable by means of special instructions, and are accessible to the control hardware. Configuration registers (CRs) 56 which may be loaded by the hardware and by special instructions serve to set the configuration of each dynamic hardware structure and the clock speed of the chip. Different CR values are used to represent different complexity-adaptive configurations, but not all of them may be practical.

Particular CR bits are used to control the frequency of a dynamic clocking system 57 of the CAP hardware implementation. A change in these bits is effective to initiate a sequence in which the current clock is disabled and a new clock is commenced after an appropriate settling period. An instruction set architecture 58 consists of a conventional instruction set augmented with special instructions for loading the configuration registers 56 and reading the performance counters 54.

A CAP compiler 60 acquires information concerning the application 61 and, using the instruction set architecture, implements configuration control executable with CAP configuration instructions at 63. With the assistance of a runtime system 64 and dynamic reconfiguration control logic 65 in the CAP hardware implementation 53, and the use of predetermined knowledge about each configuration's IPC and clock speed characteristics, the compiler creates a configuration schedule that dynamically matches the hardware implementation to the application during its execution. It is this "medium grain" adaptivity, in which reconfiguration is performed during execution of an application, that constitutes the best mode presently contemplated for practicing the invention.

The process of compiling and running an application on a CAP machine according to the present invention is performed in the following way. CAP compiler 60 analyzes the hardware requirements for different phases of execution of application 61. For example, the compiler may analyze data cache requirements based on working set analysis, or predict the achievable instruction-level parallelism (ILP) based on the application's data and control flow graphs. Both software and hardware (specifically, performance counters 54) instrumentation techniques are used in the analysis phase. With information regarding the application's hardware requirements during different phases of its execution, together with knowledge of the hardware's available configurations, the compiler 60 can determine an effective configuration schedule, and specify those points within the application at which the hardware is to be reconfigured, including identity of organizations affected. The schedule is created by inserting special configuration instructions via element 63 and CAP runtime system 64 at particular points within application 61 that load the CRs 56 with data necessary to set the desired configuration. The runtime system 64 and/or the dynamic reconfiguration control logic 65 provide dynamic runtime information in instances where such information is necessary to determine the configuration schedule.

By appropriate loading of the CRs at designated points in the execution of an application, the dynamic structure complexity is configured and reconfigured and the clock frequency is changed, to achieve optimum performance of the application's execution for each particular application among the diverse applications handled by the processor. For runtime control, the performance counters 54 are queried by the runtime system or hardware at regular intervals of operation, and using historical information concerning past decisions, from which a prediction is made of the configuration to achieve optimum performance over the next interval of the instruction stream or application execution.

It will be appreciated from the foregoing description that CAPs represent a new approach to incorporating configurability into commercial microprocessors in a low-intrusive manner. The approach or scheme exploits repeater methodologies which find increasing use with decreasing feature sizes, to render critical processor and cache hierarchy hardware structures configurable and reconfigurable with little or no cycle time impact. Employment of a dynamic clock that allows each configuration to operate at its full clock rate potential enables CAP structures and designs to incorporate a number of different IPC/clock rate design points within a single implementation. This allows the hardware organization to be tailored to the needs of a diverse application base, while still maintaining the high clock rate of conventional fixed designs.

Although the best mode presently contemplated for practicing the invention has been described by way of a presently preferred embodiment and method, it will be recognized that variations and modifications of the described embodiment and method may be implemented without departing from the true spirit and scope of the invention. Accordingly, it is intended that the invention shall be limited only by the appended claims and the pertinent rules of applicable law.

What is claimed is:

1. A complexity-adaptive hardware/software system for a microprocessor to execute any of a plurality of diverse applications according to a predetermined instruction set architecture, said system comprising dynamic hardware structures of the microprocessor for executing any particular application among said plurality of diverse applications; said dynamic hardware structures being adaptable to be organized in any of a plurality of potential configurations which are selectable according to the particular application to be executed, wherein each of the plurality of potential configurations has a unique complexity of hardware; and configuration means responsive to the particular application to be executed, the instruction set architecture, and the potential configurations in which the dynamic hardware structures maybe organized, for configuring said dynamic hardware structures to be organized in one of the plurality of potential configurations, and for reconfiguring said dynamic hardware structures to be organized in a different one of the plurality of potential configurations when another of said diverse applications is being executed, whereby to adapt hardware implementation and thereby optimize performance of the microprocessor according to each particular application being executed among the plurality of diverse applications that may be executed.

2. The complexity-adaptive hardware/software system of claim 1, wherein a hardware portion of the system includes a dynamic clock for synchronous operation of each configuration into which said dynamic hardware structures are organized, and said configuration means comprises control means for modifying clock speed during execution of each particular application according to performance characteristics of clock speed and instructions per cycle of each said configuration, whereby to dynamically match a respective configuration to changing requirements of an instruction stream derived from said predetermined instruction set architecture, for said optimization of microprocessor performance.

3. The complexity-adaptive hardware/software system of claim 1, wherein said configuration means comprises configuration control including dynamic reconfiguration control logic for acquiring sufficient information concerning each particular application among the diverse applications to be executed and performance characteristics of instructions per cycle and clock speed of each configuration into which said dynamic hardware structures are organizable, from which to predict a configuration for optimum performance over each interval of execution of an application and thereby to create a configuration schedule for adapting the organization of said dynamic hardware structures to changing requirements during execution of each application.

4. The complexity-adaptive hardware/software system of claim 3, wherein said configuration control further includes performance counters for tracking the performance of each of said dynamic hardware structures and for supplying digital indicators of such performance to said dynamic reconfiguration control logic.

5. The complexity-adaptive hardware/software system of claim 4, wherein said configuration control further includes configuration registers for setting the configuration of said dynamic hardware structures according to digital data loaded into said configuration registers, and wherein loading of said configuration registers is performed at least in part by said dynamic reconfiguration control logic from digital performance indicators supplied thereto by said performance counters.

6. The complexity-adaptive hardware/software system of claim 5, wherein said configuration control further includes a compiler for generating executable commands and configuration instructions in response to an application to be executed and the instruction set architecture, and a runtime system for operating on said commands and instructions and on said digital performance indicators from said performance counters to supply data representative thereof to said dynamic reconfiguration control logic and to assist in loading said configuration registers, whereby to aid in creating said configuration schedule used in executing an application.

7. The complexity-adaptive hardware structure of claim 1, further comprising means for selectively disabling at least some of said elements while leaving the remaining elements enabled.

8. The complexity-adaptive hardware structure of claim 7, further comprising a dynamic clock for setting processor clock speed of said microprocessor according to the configuration of said hardware structure for executing a current application, wherein said dynamic clock sets the processor clock speed according to the number of said elements enabled to execute said application.

9. The complexity-adaptive hardware structure of claim 7, further comprising means for setting the latency of said hardware structure according to the configuration of said hardware structure for executing a current application, wherein said latency is set according to the number of said elements enabled to execute said application.

10. The complexity-adaptive hardware structure of claim 1, wherein the unique complexity of hardware comprises a unique number of hardware elements.

11. The complexity-adaptive hardware structure of claim 1, wherein optimizing performance comprises optimizing energy.

12. The complexity-adaptive hardware structure of claim 1, wherein said complexity-adaptive hardware structure does not require a new instruction set architecture.

13. An adaptive hardware structure for a microprocessor, comprising a plurality of substantially identical elements coupled in segments of global address and data buses of said hardware structure; buffers connected between the elements to reduce segment delay in both of said buses, wherein each segment has substantially equal delay and is electrically isolated from its adjacent segments by said buffers so that individual element delays are independent of the number of other elements in said hardware structure, whereby the element delays are the same irrespective of the size of the structure; means for conditional reconfiguration of said hardware structure; a dynamic clock for setting processor clock speed of said microprocessor according to the configuration of said hardware structure for executing a current application; said data bus adapted to carry instructions to be executed by the microprocessor; wherein the magnitude of instructions issued per cycle relative to clock speed is variable according to the current configuration of the hardware structure.

14. The adaptive hardware structure for a microprocessor of claim 13, wherein said means for conditional reconfiguration includes means for selectively disabling at least some of said elements while leaving the remaining elements enabled.

15. The adaptive hardware structure for a microprocessor of claim 14, wherein said conditionally disabling means comprises means for selectively disabling each element independently of the other elements of the structure.

16. The adaptive hardware structure for a microprocessor of claim 14, wherein said dynamic clock sets the processor clock speed according to the number of said elements enabled to execute said application.

17. The adaptive hardware structure for a microprocessor of claim 16, wherein said dynamic clock sets the processor clock speed according to the status of said boundary for execution of said application and said magnitude of instructions issued per cycle relative to clock speed is varied according to said boundary.

18. The adaptive hardware structure for a microprocessor of claim 14, wherein said magnitude of instructions issued per cycle relative to clock speed is varied according to said number of elements enabled.

19. The adaptive hardware structure for a microprocessor of claim 13, wherein said elements include primary and backup elements having a boundary there between, said primary elements being relatively faster than said backup elements.

20. The adaptive hardware structure for a microprocessor of claim 19, wherein said means for conditional reconfiguration includes means for changing the boundary between said primary and backup elements.

21. The adaptive hardware structure for a microprocessor of claim 13, wherein said buffers are located in each segment of said global address and data buses, between adjacent ones of said elements.

22. The adaptive hardware structure of claim 13, wherein said buffers comprise repeaters.

23. A method for rendering a hardware structure for a microprocessor adaptive, comprising the steps of coupling a plurality of substantially identical elements in segments of global address and data buses of said hardware structure; connecting buffers between the elements to reduce segment delay in both of said buses, so that each segment has substantially equal delay and is electrically isolated from its adjacent segments by said buffers to render individual element delays independent of the number of other elements in said hardware structure, whereby the element delays are the same irrespective of the size of the structure; conditionally reconfiguring said hardware structure either by selectively disabling at least some of said elements while leaving the remaining elements enabled or by using primary and backup elements of respectively faster and slower elements and changing the boundary therebetween; setting processor clock speed of said microprocessor with a dynamic clock according to the number of said elements enabled or the status of the boundary between primary and backup elements, respectively, for executing a current application of said hardware structure; and issuing instructions to be executed by the microprocessor on said data bus, wherein the magnitude of instructions issued per cycle relative to clock speed is variable according to said number of elements enabled or said status of the boundary, respectively.

24. The method of claim 23, including a step of locating said buffers in each segment of said global address and data buses, between adjacent ones of said elements.

25. The method of claim 23, wherein the step of selectively disabling is performed by selectively disabling each element independently of the other elements of the structure.

26. A complexity-adaptive cache hierarchy for a microprocessor including at least one of an address bus and a data bus; a pair of inter-coupled cache memories having a movable boundary therebetween defining the timing of the two cache memories, each of said cache memories including cascaded increments assigned thereto according to the needs of a selected application to be executed; one of said cache memories having longer address and data bus delays than the other and thereby requiring more access cycles; means for reconfiguring the cache memories without invalidating or transferring data, including means for adding an increment to or subtracting an increment from one of said caches to increase or decrease the size and associativity thereof by the incremental size and associativity, and to change the size and associativity of the other cache accordingly, whereby to maintain a constant mapping of index and tag bits independent of placement of the boundary between the two caches, and to place a cache block in either one or the other but not both of the two caches.

* * * * *